B. E. ELDRED.
COMPOUND METAL.
APPLICATION FILED OCT. 26, 1911.
1,083,070.
Patented Dec. 30, 1913.
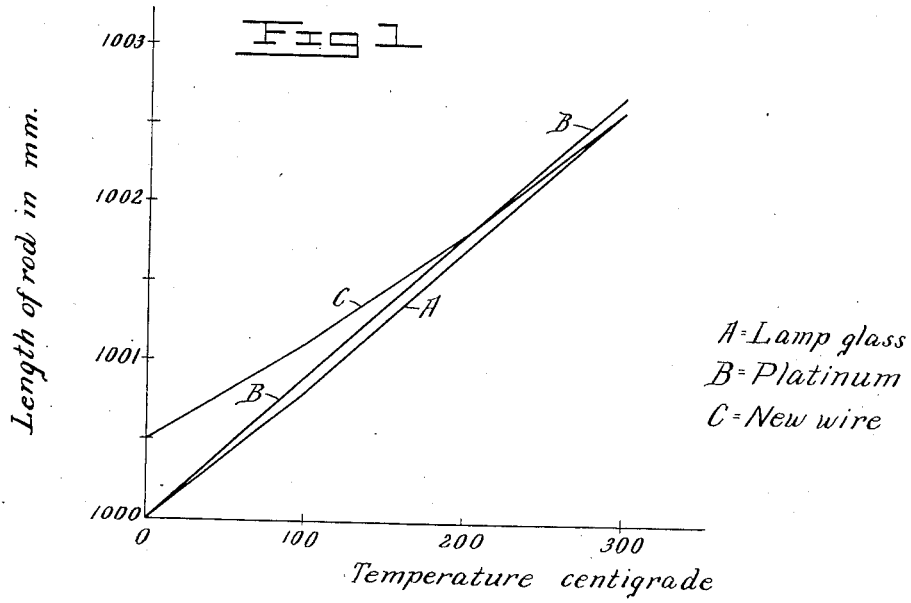
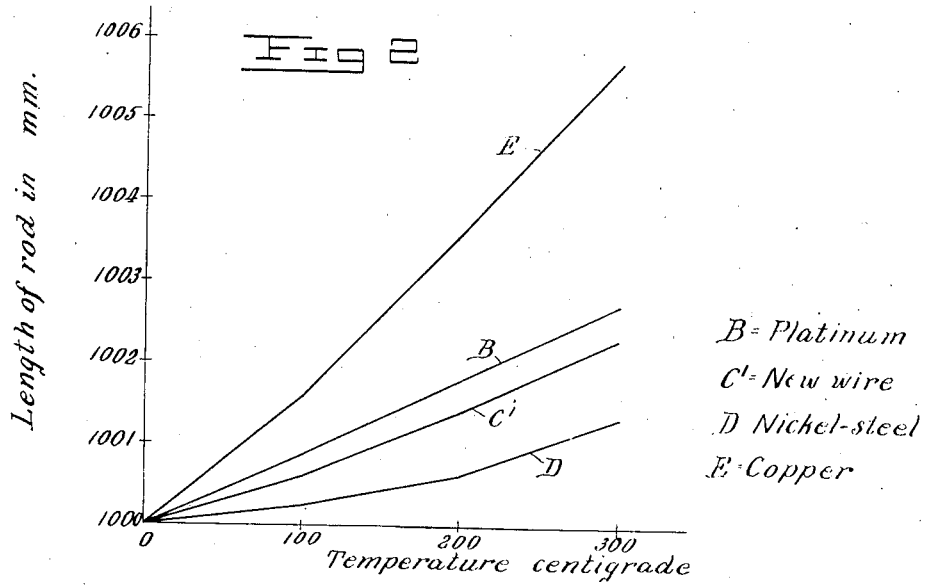

UNITED STATES PATENT OFFICE.

BYRON E. ELDRED, OF NEW YORK, N. Y.

COMPOUND METAL.

1,083,070.      Specification of Letters Patent.      Patented Dec. 30, 1913.

Application filed October 26, 1911. Serial No. 656,987.

*To all whom it may concern:*

Be it known that I, BYRON E. ELDRED, a citizen of the United States, residing at New York, in the county of New York and State of New York, have invented certain new and useful Improvements in Compound Metals, of which the following is a specification.

This invention relates to compound metals; and it comprises a composite wire or conductor of two or more metals having compensating rates of expansion and having a core of metal of a low rate of expansion at moderate temperatures (said core advantageously being of nickel-steel), firmly and permanently united by a metallic union to a sheath or sheaths of one or more high melting metals having a substantially uniform and higher rate of expansion, such as copper, gold, silver and platinum, such composite wire, as a whole, having a low and approximately uniform rate of expansion; as for example, a composite wire having a nickel steel core of low expansion, an annular layer of copper welded thereto and an annular layer of platinum welded to the copper, the composition of the core, and, consequently, its expansion, and the thicknesses of the sheath layer or layers being so correlated that the wire, as a whole, has a low, substantially uniform rate of expansion, such rate of expansion being less than that of platinum or less than about .00000899; and it further comprises a compound article such as an electric lamp, having a body of glass with such a wire sealed therein and with the portions of the glass next to such wire under compression; all as more fully hereinafter set forth and as claimed.

Electric lamps and the like are generally provided with leading-in wires of platinum sealed in or through their walls; platinum having the property of making a gas-tight union with fused and softened glass. Platinum expands and contracts about .00000899 to .0000091 for each centigrade degree change in temperature, and as glass at temperatures below, say, 100° C. can be obtained of an expansion as high as 0.00000810, (rising to 0.0000087 or 0.0000088 at temperatures around 300° C.) a union can be formed with platinum at the softening point of such glass which in most cases will persist on cooling. The tendency of the platinum, which contracts more on cooling, to shrink away from the glass is resisted by the mechanical strength of the union formed with the softened glass. In the cooled lamp the layers of glass next the wire are however under tension and this may produce cracks and air leaks. It has not proved practicable to substitute any other metals for platinum since all the other high melting metals have a still greater rate of expansion and none of them tends to form the same physical union with glass. Certain alloys, such as nickel steel may be produced of various low rates of expansion; and it has been proposed to use such an alloy having an expansion equal to that of platinum or of the standard kinds of lamp glass, though, as noted, the expansion of platinum is higher than is desirable. But in any event, these metals do not form a good physical union with glass, possibly partly because of their oxidizability and partly because they lack the physical affinity for glass displayed by platinum. It has also been proposed to use compound wire produced by drawing down together a platinum tube and a contained core of nickel-steel, iron, etc., having a coefficient of expansion equal to that of platinum, in the attempt to maintain a good union between the platinum and the core. Aside from the fact that the rate of expansion of such a wire does not offer any advantage as a leading-in wire, these attempts were not successful for the reason that platinum and these baser metals do not weld together on simply heating and working, but remain with their surfaces discrete; with a seam between them through which air in time will penetrate, oxidizing the core and also making the lamps leak.

In the present invention, I have obviated the stated disadvantages and obtained certain new advantages by departing from the idea that the wire shall, as a whole, have substantially the same rate of expansion as platinum. Platinum, as stated, has a rate of expansion which is above that of the glasses, there being, as a matter of fact, no commercial glass with an expansion as high as that of platinum. The best glasses now in use for electric lamps show expansions at temperatures up to 100° C. of about .0000081. At temperatures above 100° C., the rate of expansion increases somewhat and at 300° C., it may be as high as .0000087 to .0000089; which is still a little below that of platinum.

The accompanying diagrammatic drawings will serve to make clearer the character of the present invention.

In these drawings Figures 1 and 2 show expansion curves of certain lamp materials; Fig. 3 is a large scale cross-section of the new wire; and Fig. 4 represents a mass of glass, such as a lamp stem, with the new wire sealed therein.

With the exception of curve C, Fig. 1, the curves show graphically the lengthening of bars or wires one meter long composed of glass, copper, nickel-steel, platinum, and the present composite wire, respectively, as the temperature increases from 0° to 300° C. Curve C, Fig. 1, shows the lengthening of a wire of the present invention having a length at 0° C. such that at 300° C. its length is equal to that of a rod of lamp glass also at 300° C. whose length at 0° C. is one meter. Curve A (Fig. 1) shows the rates of expansion at different temperatures for glass such as is commonly used for incandescent lamps, while curve B (Figs. 1 and 2) is a similar curve for platinum. Lamp glasses of the type commonly used soften at temperatures varying from about 275° to 320° C., and while the expansion of glass above this temperature increases in rate, this is, of course, not material since it is only the rate of expansion of solid, not fluent, glass which is important in the present connection. At the sealing temperature, say 320° to 350° the expansion of these glasses is sufficiently near that of platinum to insure a good joint, but in cooling to ordinary temperatures, the platinum tends to shrink away more or less from the glass, its rate of contraction being greater. This tendency to pull away is compensated to some extent, as stated, by the natural adhesion between glass and the platinum; but is responsible for a certain number of lost lamps, since occasionally the junction between the glass and the platinum, which is under strain, yields and allows the platinum to pull away from the glass. In the use of heavy wire for series lamps this difficulty is experienced to a greater extent than in making lamps for smaller currents, but in any case the loss from defective seals is serious.

I have discovered that I can produce a successful lamp by sealing into the glass of the lamp a composite wire which shall have, as a whole, a rate of expansion sufficiently less than that of platinum to adapt it better to glass and which, advantageously, shall have an expansion somewhat less than that of the particular glass which is to be used. The expansion of the wire is adjusted to conform to that of the particular glass to be employed; something which is, of course, impossible with a platinum wire. I employ a composite wire having a core of nickel-steel or other low-expansion high-melting alloy or metal. Low-expansion high-melting ferrous alloys are particularly advantageous for the core of the present wire. In other words, the composite wire of the present invention may comprise outer sheath of a high-melting, substantially non-oxidizable metal, such as platinum, covering and internally supported by a high-melting metallic body of lower thermal expansion than the glass into which the wire is sealed. Nickel-steel can be produced which, at temperatures under 100° C., has almost any rate of expansion desired; even to substantially no expansion. For my present purposes I prefer nickel-steel which shall have a rate of expansion, at temperatures up to 100° C., of approximately 0.0000025; a rate of course very much less than that of platinum. Nickel-steel containing about 38 per cent. of nickel, answers the purpose very well. The rate of expansion of alloys such as this is not constant. While there is a fairly constant rate of expansion from ordinary temperatures up to 160° C. or 170° C., yet above this point, the rate of expansion rapidly increases; there is a rather pronounced upward turn in the curve of expansion, at about 200° C., as shown in curve D, Fig. 2, where, for convenience, the vertical scale is one-half that of Fig. 1. In other words, an alloy which, at ordinary temperatures would have the same rate of expansion as glass, would have for the purposes of the present invention, too great an expansion at sealing temperatures. It is, therefore, necessary for the stated reason, and for other reasons later appearing, ordinarily to choose an alloy having, at ordinary temperatures, a rate of expansion materially below that of glass. The average coefficients of expansion for the 38 per cent. alloy above mentioned are approximately as follows: 25–300°, .0000049; 25–200°, .0000030; 25–100°, .0000027. But as the seal produced at a high temperature must persist at all lower temperatures and since there must not be too great a compressive stress or strain in the union of the leading-in wire and the glass in the finished lamp, it is necessary to adjust the rate of expansion at lower temperatures. To this end, I provide the nickel-steel with a metallically united expansion-regulating layer of copper, silver or gold or their alloys. All three metals have a relatively high rate of expansion, but this rate of expansion is not far from uniform or rectilinear at all temperatures here important. Curve E, Fig. 2 is the expansion curve for copper. The union between this annular sheath or layer and the nickel-steel core must be absolute, and in the nature of a weld union since otherwise, where such copper layer is employed, the wire would be useless for lamp purposes. Any seam or crevice between the metals will lead to leakage. As silver and copper do not form the wetting union with molten or softened glass which is necessary in a sealed union, whether this be because of oxidation or because of lack of physical affinity, it is next necessary to provide the composite wire with a sheath of a metal with which glass will form such a wetting union. In practice, platinum is best adapted for this purpose. This outer layer of platinum must be united to the copper, with a true metallic union, free of all flaws, seams or defects; the two metals must be in absolute metallic union at all points between abutting surfaces. The low expansion core allows the wire, as a whole, to have the desired low expansion; the sheathing layer of copper or like metal corrects and makes substantially uniform the rate of expansion of the wire as a whole while materially raising it above that of the core alone; and the outside layer of platinum provides for the necessary physical union with the glass. Each layer has its own function in producing a wire of the desired characteristics; but the characteristics of each layer are modified by reason of the presence and integral union of the various layers. The expansion of the core must be low enough to compensate not only for the higher expansion of the expansion-regulating layer of copper, but also for that of the union-securing platinum. All three layers must be in absolute metallic union with each other, or welded; and in practice this can only be secured by causing the intermediate layer of copper or the like to become fluid or molten during the process of manufacture, producing a "wetting union." All layers should be free of low-melting metals such as tin, lead and zinc to prevent injury to the platinum in making the wire and in sealing it in place.

The curve of expansion of a typical sample of wire suitable for use in my new lamp is shown in Fig. 1, curve C and Fig. 2, curve C'. It will be seen that the expansion of the wire is not far from uniform. The average coefficients of expansion for this particular sample are as follows: 25–300°, .0000073; 25–200°, .0000067; 25–100°, .0000061. It is possible to make this wire with a high-temperature coefficient as low as .0000050, but it is found in practice that it is not advisable with ordinary glasses, to go much below .0000070. With glass having an expansion coefficient of .0000081 at temperatures up to 100° C., I find that a wire having a coefficient between .0000068 and .0000072 at sealing temperatures gives particularly satisfactory results. With too low a coefficient there is too strong a contraction of the glass upon the wire, with resultant compression, and a tendency to produce cracked stems, though the comparatively large mass of glass with its considerable elasticity is well able to withstand a reasonable strain. With heavy wires, such as are used for series lamps, it is not ordinarily practicable to go even as low as .0000070 with the coefficient. It should be noted that the intermediate layer of copper in this wire has a two-fold function. Mechanically it enables a weld to be made between the platinum and the nickel steel and it also functions in partially straightening the curve of expansion of the nickel steel and giving a wire of a more nearly constant rate of expansion. In the specific embodiment of the present invention the wire has a central core of low expansion metal such as nickel-steel, a surrounding expansion-correcting layer of copper or the like, and an exterior layer of platinum. The wire as a whole must have a rate of expansion less than that of platinum where the usual lamp glass is used, or, in general, less than that of the particular glass which is to be used for the lamps. Advantageously, this expansion will be quite substantially less than that of the glass to be used. The copper and the platinum should each form a layer of substantial thickness as compared with the diameter of the wire in question. In practice the platinum layer may be thinner than the copper layer. With sufficiently thick layers of the two metals, a substantially uniform expansion of the wire as a whole, is forced; and this expansion will be substantially the same for a given change of temperature not only below 100° C. but above 100° C. up to 325° C. With a wire of this type having an expansion less than that of glass, a novel type of union is produced in sealing-in. As explained, with a platinum leading-in wire, the surrounding cohering layers of glass on cooling are under tension. With the present wire, the hot fluent glass adjusts itself to the platinum in sealing in, and as the assemblage cools, the wire contracts less rapidly than the glass so that the glass around the wire is, so to speak, shrunk on, forcing an intimate contact in the first stages of cooling while the glass is still plastic, and later producing compression. A double advantage is thus secured. The platinum surface of the composite wire gives the ideal union with glass characteristic of platinum. But while in the case of an all-platinum wire the adhesive union with glass in the finished lamp is, as before pointed out, opposed by the tensile strain due to the higher expansion and contraction coefficient of platinum, with the present composite platinum-surfaced wire sealed in glass on the contrary, the platinum-glass adhesive union is supplemented and perfected by the positive compressive pressure of the surrounding glass on all sides of the leading-in wire, owing to the fact that the expansion and contraction of the composite wire as a whole is lower than that of the glass. There is therefore much greater tendency to obtain perfect seals with the present wire than with pure platinum. In fact it is found in practice that the percentage of imperfect lamps is reduced considerably. But as before stated, for ordinary purposes the composite wire should not be designed for such low expansion coefficient as to give an excessive compression between the glass stem and the wire. Extremely low coefficient wire may be used for special purposes of course, as for example in the manufacture of mercury lamps, vapor rectifiers and the like which are preferably made of an extremely tough glass of very low expansion coefficient. As additional evidence of the importance of having a coefficient of expansion for a lead-in wire lower than that of glass the fact may be mentioned that the composite copper-nickel-steel core of the present wire has, without any coating platinum, been drawn into lamp wire and has afforded seals. With such a copper-clad ferrous alloy wire, the sealing-in operation is best carried on under non-oxidizing conditions, as for example in an atmosphere of nitrogen or other inert gas. Three lamps out of five have given perfect seals. Here the character of the seal depends, not upon any adhesion of the glass for the copper, as the surface of the latter metal oxidizes considerably in the process of sealing-in, but solely upon the strong contraction of the glass upon the wire. A glass lamp having sealed into it a leading-in wire comprising an alloy core of low but non-uniform expansion and an expansion-correcting sheathing of welded-on copper, the wire as a whole having a lower expansion than the glass, is in itself novel. For the present purposes however a welded-on outer sheathing of platinum is desirable and preferable.

In a typical embodiment of my invention, a nickel-steel billet of any desired composition, say one which will have an expansion of about 0.0000025 may be provided with a welded-on copper layer by any suitable method, as by that described in Patent 853,716 or in my co-pending application Serial No. 539,245, filed Jan. 21, 1910, and this layer turned down in a lathe to the exact relative thickness required to correct the expansion curve and then inserted in a closely fitting platinum tube or thimble. On now heating to the melting point of copper the three layers become metallically united. The billet may next be drawn to wire and annealed. In practice the nickel-steel rod may be 0.892 inches in diameter, and after the copper layer is welded on the assemblage may be turned down to a one-inch cylinder. The platinum thimble employed may have a thickness of 0.096 inch. In a finished wire of say 0.006 to 0.007 inch diameter, the thickness of the platinum may advantageously be about 0.001 inch. The foregoing dimensions are to be understood as illustrative only and capable of considerable variation.

While the expansion curves shown in the drawings represent data obtained by careful experiments, it is to be understood that such data are always subject to more or less experimental error, especially where, as in the present instance, heat measurements are involved. The curves are therefore to be considered as merely indicative of the probable comparative conduct of the materials in question, and of typical samples examined, and not as of absolute accuracy.

What I claim is:—

1. An article of manufacture comprising a wall of glass having sealed therethrough a wire of high-melting metallic material, said wire being of a rate of expansion materially less than said glass and being held in the glass under compressive strains in the union therebetween.

2. An article of manufacture comprising a wall of glass having sealed therethrough a wire of high-melting metallic material, said wire comprising a core of high-melting alloy, a linking layer of high-melting high-expansion metal and a sheath layer of platinum, all metallically united, being of a rate of expansion materially less than said glass and compression strains existing in the union between glass and wire.

3. An article of manufacture comprising a wall of glass having sealed therethrough a wire of high-melting metallic material, said wire comprising a core of low-expansion nickel-steel, a linking layer of high melting high-expansion metal and a sheath layer of platinum, all metallically united, being of a rate of expansion materially less than said glass and compression strains existing in the union between glass and wire.

4. An article of manufacture comprising a wall of glass having sealed therethrough a wire of high-melting metallic material, said wire comprising a core of nickel-steel, a linking layer of copper and a sheath layer of platinum, all metallically united, being of a rate of expansion materially less than said glass and compression strains existing in the union between glass and wire.

5. An article of manufacture comprising a body of glass and a composite wire sealed thereinto, said wire having a surface layer of platinum covering and internally supported by a body of high-melting baser metal of lower thermal expansion than said glass.

6. An article of manufacture comprising a body of glass and a composite wire sealed thereinto, said wire having a surface layer of platinum covering and internally supported by a body of high-melting baser metal of lower thermal expansion than said glass and the expansion of the wire as a whole being not greater than that of said glass.

7. An article of manufacture comprising a body of glass and a composite wire sealed thereinto, said wire having a surface layer of a high-melting and substantially non-oxidizable metal covering and internally supported by a body of high-melting baser metal of lower thermal expansion than said glass.

8. An article of manufacture comprising a wall of glass having sealed therethrough a composite platinum surfaced wire, said wire having a lower coefficient of expansion than said glass and being held in the glass under compression.

In testimony whereof, I affix my signature in the presence of two subscribing witnesses.

BYRON E. ELDRED.

Witnesses:
JOHN A. RILEY,
K. P. McELROY.